United States Patent
Wegner et al.

(10) Patent No.: US 9,921,589 B2
(45) Date of Patent: Mar. 20, 2018

(54) METHOD AND DEVICE FOR CONTROLLING A COASTING OPERATING MODE IN A MOTOR VEHICLE WITH AN INTERNAL COMBUSTION ENGINE

(71) Applicant: Ford Global Technologies, LLC, Dearborn, MI (US)

(72) Inventors: Goetz-Philipp Wegner, Dortmund (DE); Urs Christen, Aachen (DE); Rainer Busch, Aachen (DE); Frederic Stefan, Aachen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1320 days.

(21) Appl. No.: 13/623,862

(22) Filed: Sep. 20, 2012

(65) Prior Publication Data

US 2013/0116089 A1    May 9, 2013

(30) Foreign Application Priority Data

Sep. 23, 2011 (DE) .......................... 10 2011 083 332

(51) Int. Cl.
*B60W 10/02*   (2006.01)
*G05D 13/04*   (2006.01)
*B60W 30/18*   (2012.01)

(52) U.S. Cl.
CPC .............. *G05D 13/04* (2013.01); *B60W 10/02* (2013.01); *B60W 30/18072* (2013.01); *B60W 2030/1809* (2013.01); *B60W 2520/10* (2013.01); *B60W 2520/105* (2013.01); *Y02T 10/76* (2013.01); *Y10T 477/679* (2015.01)

(58) Field of Classification Search
CPC .......... B60W 10/02; B60W 30/18072; B60W 2030/1809; Y10T 477/6422
USPC ............................................. 477/110; 701/65
See application file for complete search history.

(56) References Cited

U.S. PATENT DOCUMENTS

| | | | |
|---|---|---|---|
| 4,911,275 A * | 3/1990 | Ohkumo et al. | 477/87 |
| 2006/0293824 A1* | 12/2006 | Steen et al. | 701/70 |
| 2009/0234534 A1* | 9/2009 | Stempnik | B60W 50/0205 701/30.7 |
| 2013/0013164 A1* | 1/2013 | Taguchi | 701/96 |
| 2014/0172264 A1 | 6/2014 | Bjernetun et al. | |

FOREIGN PATENT DOCUMENTS

| | | | |
|---|---|---|---|
| DE | 102008029453 | 12/2009 | |
| WO | WO2005084995 | 9/2005 | |
| WO | WO20110101949 | * 8/2011 | B60W 30/00 |

* cited by examiner

*Primary Examiner* — Stacey A Fluhart
(74) *Attorney, Agent, or Firm* — Carlson, Gaskey & Olds

(57) ABSTRACT

A method and a device for automatically deactivating a coasting operating mode in a motor vehicle with an internal combustion engine is disclosed. An activated coasting operating mode is deactivated if the current vehicle speed exceeds a threshold value. The threshold value is set as the sum of a minimum vehicle speed and of a maximum permissible increase in speed.

14 Claims, 2 Drawing Sheets

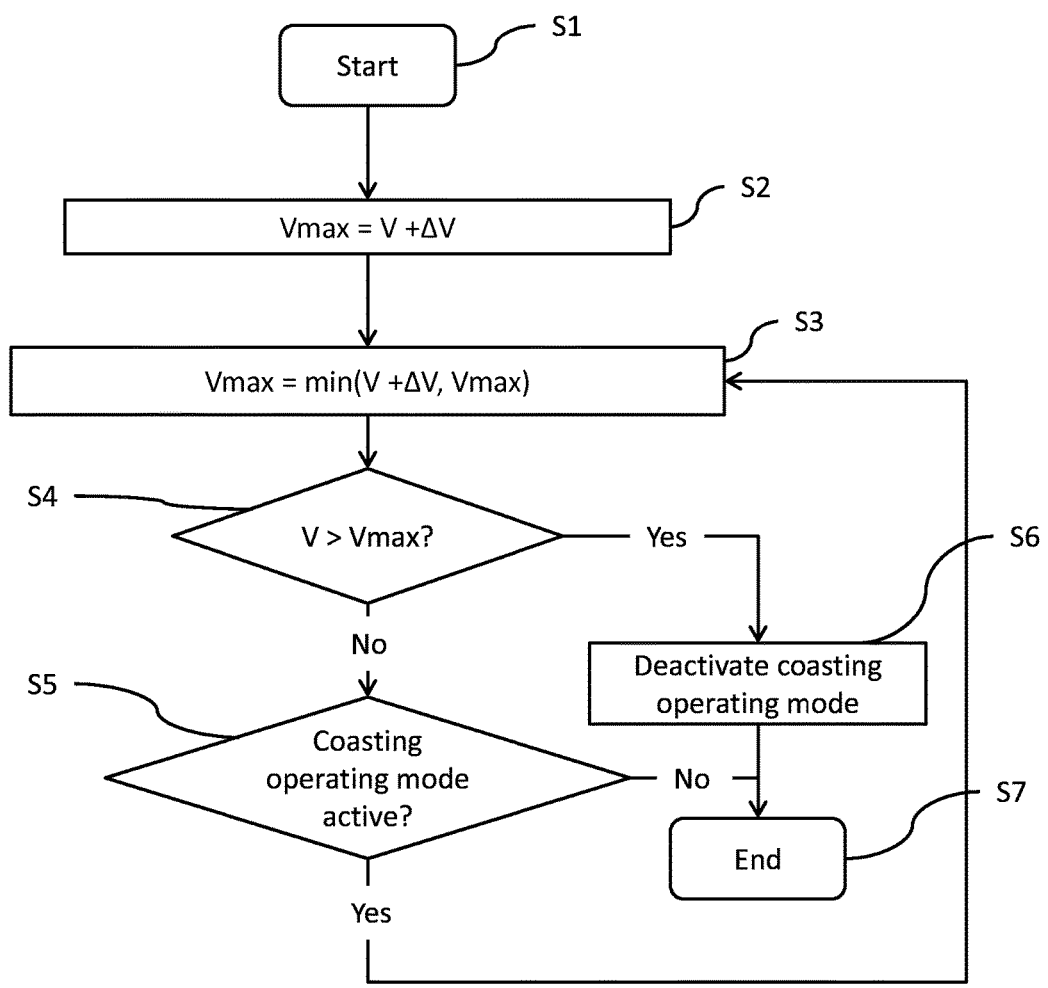

METHOD AND DEVICE FOR CONTROLLING A COASTING OPERATING MODE IN A MOTOR VEHICLE WITH AN INTERNAL COMBUSTION ENGINE

CROSS-REFERENCE TO RELATED APPLICATIONS

This application is a continuation and claims the benefit of German Patent Application No. DE 102011083332.3 titled "Method and device for automatically activating or deactivating a coasting operating mode in a motor vehicle with an internal combustion engine" filed Sep. 23, 2011 and German Patent Application No. DE 102011083326.9 titled "Method and device for operating a motor vehicle with an internal combustion engine in a coasting operating mode" filed Sep. 23, 2011, which are both hereby incorporated by reference in their entirety.

TECHNICAL FIELD

The present disclosure relates to a method and a device for automatically activating or deactivating a coasting operating mode in a motor vehicle with an internal combustion engine as a function of propulsion requests or braking requests of a driver of the motor vehicle.

BACKGROUND

A method and such a device are known from WO 2005/084995 A1.

A conventional motor vehicle with an internal combustion engine can become slower due to the engine drag torque when a driver takes their foot off the accelerator pedal. In the case of a relatively severe negative gradient the engine drag torque can be insignificant. This also depends on the mass of the vehicle, the current vehicle speed and the currently engaged gear speed.

In motor vehicles with an internal combustion engine and automatic transmission there is what is commonly referred to as a "coasting operating mode" in which the drive train is automatically opened if the driver takes their foot off the accelerator pedal. The internal combustion engine can be idled in the coasting operating mode or switched off entirely, for example, in the case of an automatic start/stop system. In the coasting operating mode, the engine drag torque is eliminated in order to save fuel.

Various driver interactions such as, for example, propulsion requests or braking requests through activating the accelerator pedal, brake pedal or activating the gear speed selector lever can cause the drive train to close, i.e. caused the coasting operating mode to terminate. With this general logic, a driver has control over the activation and deactivation of the coasting operating mode and they can choose between the coasting operating mode and rolling with the engine drag torque.

It is to be expected that drivers adapt their driving style to the presence of the coasting operating mode. This means that the driver does not expect the vehicle to become significantly slower if the driver takes their foot off the accelerator pedal. However, the vehicle behavior in the coasting operating mode is different if the road on which the vehicle is currently driving has a negative gradient or a negative gradient occurs further along the route. In particular, in the coasting operating mode the vehicle becomes faster on a moderate negative gradient.

In order to solve this problem, the abovementioned document WO 2005/084995 A1 proposes deactivating a currently activated coasting operating mode automatically even when the current vehicle speed exceeds, or significantly exceeds, a threshold value. This threshold value may be a value which is preset by the driver or set automatically as a function of the current negative gradient and/or of a negative gradient lying ahead. The current negative gradient or negative gradient lying ahead is to be determined using satellite navigation.

Determining the current negative gradient or a negative gradient lying ahead using satellite navigation is complex.

One possibility is to consider calculating the vehicle acceleration in the direction of travel either by differentiating the vehicle speed or measuring it directly and automatically deactivating a coasting operating mode if the calculated or measured vehicle acceleration exceeds a threshold value. However, differentiation of the vehicle speed can result in a noisy acceleration signal.

SUMMARY

The present disclosure makes available a simple, fast, accurate and reliable method for defining a speed threshold value at the upward transgression of which a currently activated coasting operating mode is automatically deactivated.

BRIEF DESCRIPTION OF THE DRAWINGS

There follows a description of exemplary embodiments with reference to the drawings, in which:

FIG. 3 shows a flowchart explaining a logic for terminating a coasting operating mode in a motor vehicle.

DETAILED DESCRIPTION

Figure 1:
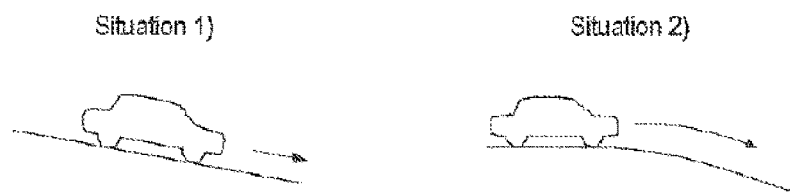
FIG. 1 shows two typical driving situations in which a motor vehicle possibly experiences an unexpected acceleration.

A threshold value at the upward transgression of which a currently activated coasting operating mode is automatically deactivated is set as a sum of a minimum vehicle speed and a maximum permissible increase in speed. The term "minimum vehicle speed" is intended in this case to denote a value which is equal to the current vehicle speed when the latter remains constant but is lower than the current vehicle speed when the vehicle becomes faster during a coasting operating mode.

At every point in time during a currently activated coasting operating mode the minimum vehicle speed is preferably defined as a function of the minimum measured vehicle speed in a time interval directly preceding this point in time, the time interval can be the entire duration of a currently activated coasting operating mode or a directly preceding time segment thereof.

The minimum vehicle speed can specifically be defined either as the minimum vehicle speed measured in the time interval or as a type of mean value of vehicle speeds measured in the time interval.

The term "maximum permissible increase in speed" denotes in this context a value which is intended to constitute either a preset fixed value or a value which is dependent on the current vehicle speed, in particular a preset fraction thereof, or is intended to be one of the two above-mentioned values plus a variable which is proportional to a permanently preset maximum permissible acceleration.

The method according to the present disclosure can be carried out, in particular, in a motor vehicle with an automatic transmission and/or automatic clutch, but is not restricted to these arrangements. This is because even in a motor vehicle with a drive train which can be opened manually (i.e. by foot or hand), a coasting operating mode can be simulated in that when propulsion requests and braking requests are absent, i.e. generally in the case of non-activation of the accelerator pedal and brake pedal, so much fuel/air mixture is fed to the internal combustion engine that the engine friction loss is virtually compensated. In such a case, the method according to the invention can also be correspondingly applied. It is to be noted that a "coasting operating mode" is to be understood differently in a motor vehicle with a drive train which can be opened manually (i.e. as a rule with a manual shift transmission and/or a foot-activated clutch) rather than an automatic cruise controller in which not only the engine friction loss but also all the other losses, in particular those due to rolling resistance and air resistance, are compensated, and also differently than a fuel overrun cut-off in which the entire engine drag torque is experienced.

The driver of a motor vehicle controls the vehicle speed in accordance with the driving situation. The vehicle accelerates if the driver depresses the accelerator pedal and the vehicle becomes slower if the driver takes their foot off the accelerator pedal. However, when the vehicle travels downhill with a severe negative gradient the vehicle can accelerate. In such a situation, the driver must generally apply the brakes in order to reduce the vehicle speed or keep it constant.

A motor vehicle with an automatic transmission and/or automatic clutch which can change into what is referred to as the coasting operating mode automatically opens the clutch if the driver takes their foot off the accelerator pedal. The vehicle acceleration or vehicle deceleration depends essentially only on the air resistance and rolling friction as well as the current inclination of the road since the engine drag torque is eliminated. In the case of downhill driving, a motor vehicle in the coasting operating mode accelerates when there is a relatively gentle negative gradient or the vehicle accelerates more quickly than a conventional vehicle when rolling without the accelerator pedal or clutch pedal being activated.

FIG. 1 shows two typical driving situations which can lead to acceleration of the vehicle. Situation 1 shows a vehicle driving on a road with a constant, medium or severe negative gradient. Situation 2 shows a vehicle driving on a road with a gradually increasing negative gradient. In both situations, there are a number of reasons why the coasting operating mode may be undesirable.

The two above-mentioned situations require different procedures. In situation 1, the vehicle is initially not in the coasting operating mode and it is possible to prevent the vehicle from entering the coasting operating mode by setting a coasting prohibition marker in the electronic controller responsible for the coasting operating mode, when a vehicle acceleration is to be expected.

Figure 2:
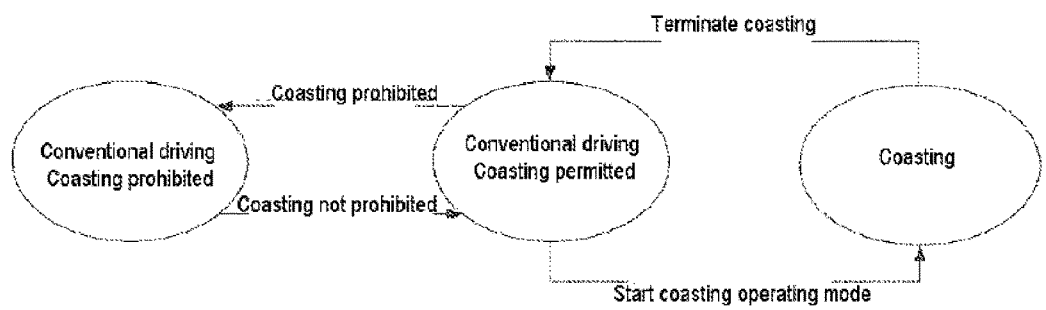
FIG. 2 shows the basic principle of activation or deactivation and of permitting or prohibiting a coasting operating mode in a motor vehicle so that the latter does not experience any undesired acceleration.

In situation 2, the vehicle is initially in the coasting operating mode and then starts to become faster because of the increasing negative gradient. In this case, the coasting operating mode terminates in that a coasting termination request is set in the electronic controller and the coasting prohibition marker can be set. This principle is illustrated in FIG. 2.

A prediction as to whether the vehicle will accelerate in situation 1 can be made on the basis of the severity of the negative gradient of the road. This severity can be measured or estimated by monitoring the vehicle behavior independently of the coasting operating mode. If the severity of the negative gradient of the road is above a specific threshold value, coasting must be prevented. This threshold value can be a constant value or a speed-dependent value and it can be combined with a certain dwell time.

In many cases such as, for example, in situation 2, the negative gradient of the road changes during the coasting process. The vehicle cannot accelerate at the start of a coasting phase but rather only later when the negative gradient of the road becomes more severe. For this case it is sufficient to terminate the coasting on the basis of one of the three following methods: firstly the negative gradient of the road can be determined and compared with a threshold value; secondly the vehicle acceleration can be determined and compared with a threshold value; and thirdly the change in the vehicle speed can be compared with a threshold value during the coasting process. This can occur independently of whether the coasting prohibition marker is set on the basis of the negative gradient alone. However, the cause of the termination can also be a set coasting prohibition marker with the result being that coasting is disabled as long as the coasting prohibition marker is not deleted. The strategy for deleting the coasting prohibition marker depends on the respective control strategy and can be different for each cause. For example, the coasting prohibition marker is deleted only if the driver depresses the accelerator pedal after the coasting operating mode has been terminated as a result of the permitted acceleration being exceeded. Alternatively, the coasting prohibition marker can be deleted automatically if the cause (or trigger) no longer exists (for example the negative gradient of the road is below a threshold value). As a result, the coasting operating mode can be restarted without driver interaction.

In one method for terminating of the coasting operating mode on the basis of an increase in the speed during coasting, the acceleration is not limited but instead the effect of the acceleration is controlled and restricted. The advantage of this method is that the effect of the acceleration is controlled directly and differentiation is not necessary. The use of the vehicle speed signal permits small threshold values (for example increases in vehicle speed of 5 km/h).

The underlying algorithm for such vehicle speed control is illustrated in the flowchart in FIG. 3. When the coasting operating mode is started (at step 1), a threshold value Vmax for the vehicle speed in the coasting operating mode is set as the current vehicle speed V plus a permanently preset maximum permissible increase, ΔV, in speed (at step S2). The current vehicle speed V can become lower during the coasting operating mode. For this reason, the threshold value Vmax is continuously adapted to the current vehicle speed V by virtue of the fact that said threshold value is set as the lower of the two values V+ΔV and of the previous Vmax (step S3). In step S4 it is tested whether the current vehicle speed V is higher than the threshold value, Vmax. If the result in step S4 is "no", in step S5 it is tested whether the coasting operating mode is still active or has been deactivated by some other condition, for example, a driver interaction. If the result in step S5 is "yes", the system returns to step S3. If the result in step S4 is "yes", the coasting operating mode is deactivated (at step S6) and the algorithm is terminated (at step S7). If the result of step S5 is no, the algorithm is also terminated (at step S7).

If the activation and respective deactivation of the coasting operating mode also comprises permitting and respectively prohibiting the coasting operating mode by means of a coasting prohibition marker, as explained in conjunction with FIG. 2, in step S6 the coasting prohibition marker is also set to ensure that the vehicle does not enter the coasting operating mode again. The coasting prohibition marker can be deleted by a driver interaction, for example, if the driver depresses the acceleration pedal. Or the marker can be deleted automatically without driver interaction, for example, if the speed is below a threshold value.

What has been stated above means that an activated coasting operating mode is deactivated if the current vehicle speed exceeds a threshold value which is set as the sum of a minimum vehicle speed and a maximum permissible increase in speed, the minimum vehicle speed is the lowest vehicle speed measured during the coasting operating mode.

The underlying algorithm described above does not permit constant low acceleration during coasting. However, this is desired in coasting situations in which the driver would like to use the negative gradient for slight acceleration. In this respect, the above algorithm for the vehicle speed control can be improved by adding a value to the value, Vmax, in the minimum selection at step S3, which value is the product of a preset permitted acceleration, a, and of a suitably selected sampling time T: Vmax=min (V+ΔV, Vmax+a·T).

In another development, the maximum permissible increase ΔV in speed is not a fixed value but instead is dependent on the speed by virtue of the fact that the maximum permissible increase is, for example, 10% of the current vehicle speed so that at relatively high vehicle speeds, relatively large increases in speed are also permitted without the coasting operating mode being deactivated.

In summary, the described algorithm has the effect that during a coasting phase the minimum, i.e. lowest vehicle speed, is determined continuously and only restricted. Upward transgression of this speed is permitted without the coasting phase being terminated.

In one development thereof the minimum vehicle speed can be slowly adjusted to the current vehicle speed. This may be done by filtering a vehicle speed signal, i.e. a type of formation of mean values in which relatively new signal components can also be weighted to a greater extent. The coasting phase is then terminated if the filtered minimum vehicle speed is exceeded by a certain absolute value. As a result, slow increases in speed are permitted without the coasting phase being terminated. However, when there are relatively large increases in speed, which possibly surprise the driver, the coasting phase is terminated.

We claim:

1. A method for automatically deactivating a coasting operating mode in a motor vehicle with an internal combustion engine, comprising:

deactivating a coasting operating mode if a current vehicle speed exceeds a threshold value;

wherein the threshold value is set as a sum of a minimum vehicle speed and a maximum permissible increase in speed; and setting a coasting prohibition marker for temporarily preventing operation in the coasting operating mode.

2. The method as claimed in claim 1, wherein the minimum vehicle speed is defined as a minimum vehicle speed measured in a time interval directly preceding deactivation of the coasting operating mode.

3. The method as claimed in claim 2, wherein the time interval is a time interval equal to an entire duration of the coasting operating mode activation.

4. The method as claimed in claim 2, wherein the minimum vehicle speed is defined as a mean value of vehicle speeds measured during the time interval.

5. The method as claimed in claim 1, wherein the maximum permissible increase in speed is either: a preset fixed value; a preset fraction of a current vehicle speed; the preset fixed value plus a variable proportional to a preset maximum permissible acceleration; or the preset fraction of the current vehicle speed plus a variable proportional to the preset maximum permissible acceleration.

6. The method of claim 1, wherein the deactivating step includes engaging a drive train of the motor vehicle.

7. The method of claim 1, wherein the maximum permissible increase in speed is a non-fixed value dependent on the current vehicle speed.

8. The method of claim 1, comprising periodically adjusting the minimum vehicle speed based on the current vehicle speed.

9. The method of claim 8, wherein periodically adjusting the minimum vehicle speed includes filtering a signal representative of the current vehicle speed.

10. A method of operating a vehicle in a coasting operating mode, comprising:

activating a coasting operating mode;

measuring vehicle speed;

deactivating the coasting operating mode when a vehicle speed is greater than a minimum speed plus a predefined maximum change in speed, and the predefined maximum change in speed is a non-fixed value dependent on a current vehicle speed; and setting a coasting prohibition marker for temporarily preventing operation in the coasting operating mode.

11. The method of claim 10, wherein the minimum speed is a measured value based on vehicle speed during activation of the coasting operating mode.

12. The method of claim 10, wherein the minimum speed is a measured value based on vehicle speed prior to deactivation of the coasting operating mode.

13. The method of claim 10, wherein the minimum speed is defined by a mean value of measured vehicle speeds during activation of the coasting operating mode.

14. The method of claim 10, wherein the predefined maximum change in speed is defined by any one of: a preset fraction of the current vehicle speed; and the preset fraction of the current vehicle speed plus a variable proportional to the preset maximum acceleration.

* * * * *

UNITED STATES PATENT AND TRADEMARK OFFICE
CERTIFICATE OF CORRECTION

PATENT NO. : 9,921,589 B2
APPLICATION NO. : 13/623862
DATED : March 20, 2018
INVENTOR(S) : Goetz-Philipp Wegner et al.

Page 1 of 1

It is certified that error appears in the above-identified patent and that said Letters Patent is hereby corrected as shown below:

In the Claims

In Claim 14, Column 6, Line 58; replace "the preset maximum acceleration." with --a preset maximum acceleration.--

Signed and Sealed this
Twenty-fifth Day of September, 2018

Andrei Iancu
*Director of the United States Patent and Trademark Office*